Aug. 4, 1925.  
H. C. LORD  
SHACKLE  
Filed March 22, 1923  
1,548,051
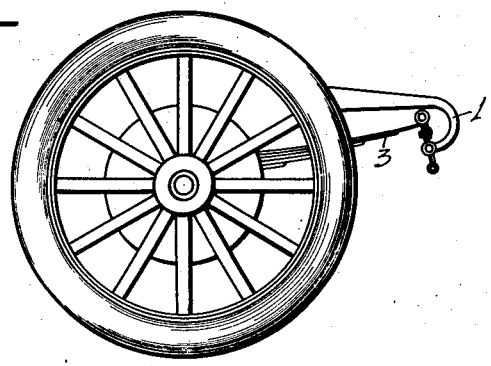
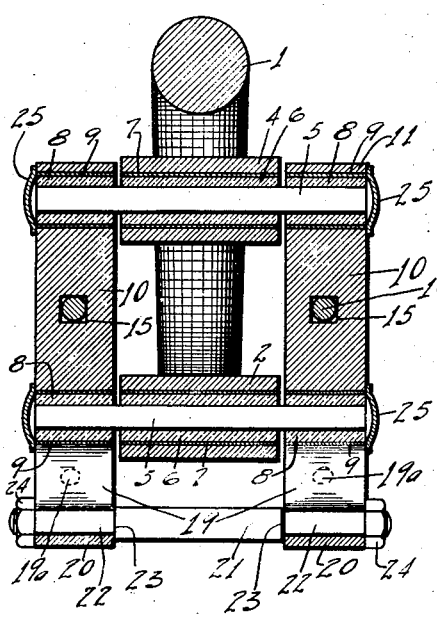 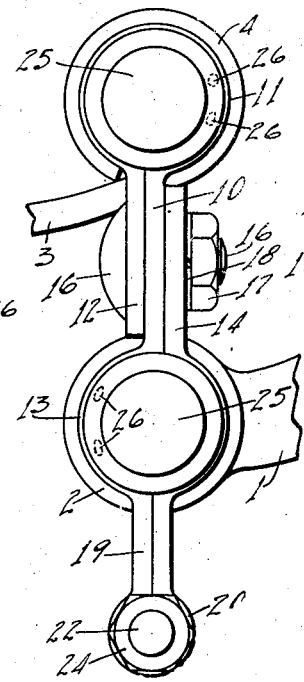 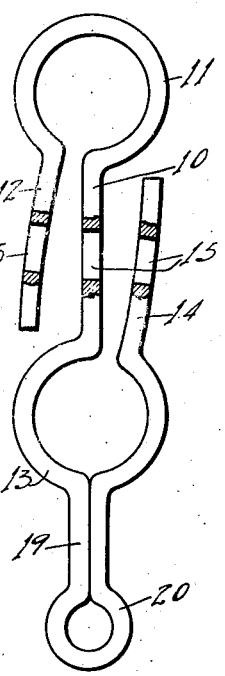
Inventor Patented Aug. 4, 1925.

1,548,051

UNITED STATES PATENT OFFICE.

HUGH C. LORD, OF ERIE, PENNSYLVANIA.

SHACKLE.

Application filed March 22, 1923. Serial No. 626,875.

*To all whom it may concern:*

Be it known that I, HUGH C. LORD, a citizen of the United States, residing at Erie, in the county of Erie and State of Pennsylvania, have invented new and useful Improvements in Shackles, of which the following is a specification.

This invention is particularly designed to improve shackle hangers. Such hangers are commonly used with shackles for springs. It is particularly suited for a joint made up of sections in which there are swinging parts to which the hangers are attached. In carrying out my invention I preferably use a strap of metal, bend eyes in the strap of metal, and form return extensions which may be utilized for closing the eyes on the joint parts. Other features of the invention will appear from the specification and claims.

The invention is illustrated in the accompanying drawings as follows:—

Fig. 1 shows a rear end of an automobile with a spring hanger in place.

Fig. 2 a central vertical section through the shackle and joints.

Fig. 3 a side elevation of the shackle in place.

Fig. 4 a detached portion of the shackle bar, the closure caps being removed.

1 marks a goose neck of an automobile, 2 a sleeve at the end of the neck, 3 a spring and 4 a spring eye. The joint has a pin 5 extending through the spring eye, a rubber joint element 6 bonded to the pin and an outer shell 7, one of these elements being inserted in the sleeve 2 and another in the spring eye with a pressed fit. The rubber joint elements 8 are secured to the outer ends of the pin 5 and these are enclosed by metal shells 9. The hangers are secured to these outer shells 9.

The hanger is formed of a bar 10 in which is bent the eye 11 with a return extension 12 and an eye 13 with a return extension 14. These extensions and the connecting bar have the openings 15 through which a clamping bolt 16 is passed. The clamping bolt is provided with a nut 17 and a lock washer 18. The opening 15 is preferably square and what is commonly known as a carriage bolt is used so as to lock it in the squared opening. I prefer to make the extensions 12 and 14 slightly bent so that they are put under initial tension and the ends crowded into closer engagement with the connecting bar. This tends also to facilitate the closing of the eyes 11 and 13 so as to clamp these eyes on the shells 9. In order to brace the two hangers, one at each side of the joint, it is preferable to have a cross bar and this is provided in this structure by a brace extension 19 which is formed by extending the bar from the eye 13 with a brace eye 20 in its lower end and the bar turned upon itself so as to continue the eye 13. The two parts 19 are connected by spot welding at 19ª. A cross pin 21 has the reduced ends 22 which extend through the eyes 20 and nuts 24 are arranged at the outer ends clamping these in place, the reduced portion forming a shoulder 23 which opposes the nut 24.

Closure caps 25 are arranged over the eyes 11 and 13. These are secured to the edges of these eyes by spot welding at 26. They are secured only at one side of the eye and preferably the side opposite the extensions 12 and 14 so as not to interfere with the clamping movement of the eyes.

What I claim as new is:—

1. A shackle hanger comprising a connecting bar; clamping eyes formed on the connecting bar; return extensions on the eyes projecting along the bar; and means clamping the extensions on the bar and closing the eyes by the springing of the metal of the eyes.

2. A shackle hanger comprising a connecting bar; clamping eyes formed on the connecting bar; overlapping return extensions on the eyes projecting along the bar; and means clamping the extensions on the bar and closing the eyes by the springing of the metal of the eyes.

3. A shackle hanger comprising a connecting bar; clamping eyes formed on the connecting bar; return extensions on the eyes projecting along the bar; and means clamping the extensions on the bar and closing the eyes by the springing of the metal of the eyes, said extensions being initially bent whereby they are under tension when in place.

4. A shackle hanger comprising a connecting bar; clamping eyes formed on the connecting bar; overlapping return extensions on the eyes projecting along the bar; and means clamping the extensions on the bar and closing the eyes by the springing of the metal of the eyes, said extensions being initially bent whereby they are under tension when in place.

5. A shackle hanger comprising a connecting bar; clamping eyes formed on the connecting bar; overlapping return extensions on the eyes projecting along the bar; and a bolt extending through the extensions and connecting bar clamping the extensions on the connecting bar and closing the eyes.

6. A shackle hanger comprising a connecting bar; clamping eyes formed in the connecting bar, said eyes extending from opposite sides of the bar; return extensions on the eyes projecting along the bar; and means clamping the extensions on the bar for closing the eyes.

7. A shackle hanger comprising a connecting bar; clamping eyes formed on the connecting bar; return extensions on the eyes projecting along the bar; and means clamping the extensions on the bar and closing the eyes by the springing of the metal of the eyes, said hanger having a brace eye formed in the bar.

8. A shackle hanger comprising a connecting bar; clamping eyes formed on the connecting bar; return extensions on the eyes projecting along the bar; and means clamping the extensions on the bar and closing the eyes by the springing of the metal of the eyes, said hanger having a brace extension from one eye and a brace eye formed in the extension.

9. In a shackle, the combination with a joint member; shackle hangers arranged at each end of said joint member, said hangers comprising connecting bars; clamping eyes formed on the connecting bars; return extensions on the eyes projecting along the bars; and means clamping the extensions on the bar and closing the eyes on the joint member.

10. In a shackle, the combination with a joint member; shackle hangers arranged at each end of said joint member, said hangers comprising connecting bars; clamping eyes formed on the connecting bars; return extensions on the eyes projecting along the bars; means clamping the extensions on the bar and closing the eyes on the joint member; a brace eye formed in the bars; and a connecting brace between the eyes.

11. In a shackle, the combination with a joint member; shackle hangers arranged at each end of said joint member, said hangers comprising connecting bars; clamping eyes formed on the connecting bars; return extensions on the eyes projecting along the bars; means clamping the extensions on the bar and closing the eyes on the joint member; a brace extension extending from the two opposite eyes; a brace eye formed in the brace extension; and a bar extending through the brace eyes.

12. In a shackle, the combination with a joint member; shackle hangers arranged at each end of said joint member, said hangers comprising connecting bars; clamping eyes formed on the connecting bars; return extensions on the eyes projecting along the bars; means clamping the extensions on the bar and closing the eyes on the joint member; a brace extension extending from the two opposite eyes; a brace eye formed in the brace extension; and a bar extending through the brace eyes, said bar having reduced ends and clamping nuts at its ends.

13. A shackle joint hanger having clamping eyes at its ends and cover plates arranged over said eyes.

14. A shackle joint hanger having clamping eyes at its ends and cover plates arranged over said eyes, said cover plates being secured at one side of said eyes.

15. A shackle hanger comprising a connecting bar; clamping eyes formed on the connecting bar; return extensions on the eyes projecting along the bar; means clamping the extensions on the bar and closing the eyes by the springing of the metal of the eyes; and cover plates secured to the edges of said eyes and covering said eyes.

16. A shackle hanger comprising a connecting bar; clamping eyes formed on the connecting bar; return extensions on the eyes projecting along the bar; means clamping the extensions on the bar and closing the eyes by the springing of the metal of the eyes; and cover plates secured to the edges of said eyes closing one end of said eyes, said cover plates being secured at one side of the eyes to permit of the closing of the eyes.

In testimony whereof I have hereunto set my hand.

HUGH C. LORD.